Sept. 9, 1924.

A. C. O. BOCK

FINGERPRINT MACHINE

Filed June 1, 1921

INVENTOR
Alfred Charles Otto Bock
BY
Thomas How ATTORNEY

Sept. 9, 1924.

A. C. O. BOCK

1,507,882

FINGERPRINT MACHINE

Filed June 1, 1921

Patented Sept. 9, 1924.

1,507,882

UNITED STATES PATENT OFFICE.

ALFRED CHARLES OTTO BOCK, OF BROOKLYN, NEW YORK, ASSIGNOR TO FINGERPRINT MACHINE CORPORATION, A CORPORATION OF NEW YORK.

FINGERPRINT MACHINE.

Application filed June 1, 1921. Serial No. 474,139.

*To all whom it may concern:*

Be it known that I, ALFRED CHARLES OTTO BOCK, a citizen of the United States of America, residing at Brooklyn, county of Kings, and State of New York, have invented new and useful Improvements in Fingerprint Machines, of which the following is a specification.

This invention relates to apparatus for recording or fixing the print of a finger or the like upon a sheet of paper or other suitable recording surface.

The object of the invention is to provide improvements as will hereinafter appear.

Other and ancillary objects of the invention will appear hereinafter.

In the accompanying drawings which illustrate the invention—

Referring to the drawings, the apparatus comprises a casing 1 having a glass window 2 through which the interior of the casing may be observed and also a grating 3 whereby the interior is ventilated.

A platen 4 upon which the paper to be imprinted is placed, is pivoted at its rear end on each side of the backwardly bent arms 5 and 6. A member comprising the strip 7 secured at the ends of the two arms 8 and 9 is pivoted in the lugs 10 and 11 upon the forward edge of the platen, the strip 7 being pressed towards the platen by means of a spring 12. This device provides a means for holding and guiding the fingers in making the imprint and also holds the paper against the platen. The platen being usually of metal, in order to avoid the too rapid conducting away of the heat, during the fixing operation as will be hereinafter referred to, a plate 13 of mica or other suitable heat insulating material is placed upon the platen in position to support the paper to be impressed. In removing the paper the strip 7 may be readily raised by the fingers in opposition to the spring 12.

Figure 5:
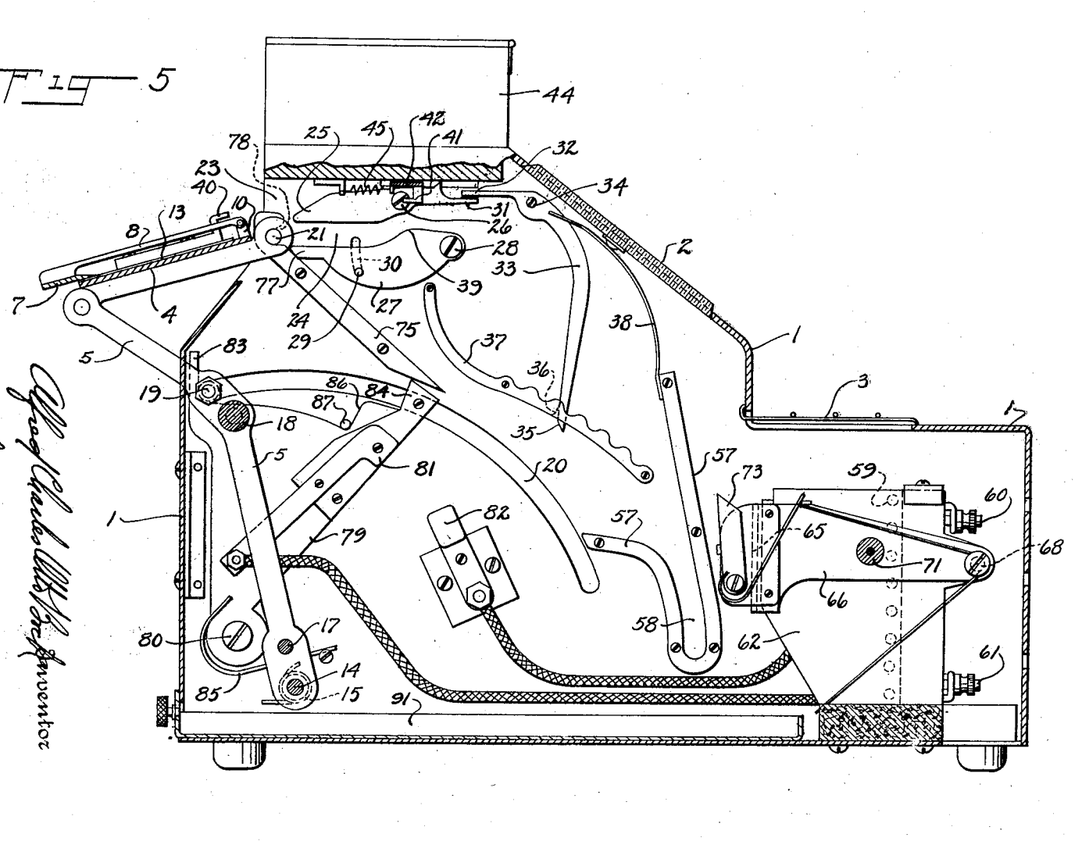
Fig. 5 is a section on the line 5—5 of Fig. 3, the paper carrier being shown in position to receive the finger print.

The arms 5 and 6 are pivoted in the frame by means of a rod 14 and springs 15 and 16 tend to hold the platen in its elevated position as shown in Fig. 5 thereby partially counterbalancing the weight of the platen and its support. The structure is further reinforced by bars 17 and 18.

Extending outwardly from the arm 5 is a handle 19 at the exterior of the casing and having its shank running in the slot 20 in the side of the casing.

At the forward end of the platen are provided laterally extending gudgeons or pins 21 and 22 which guide the platen as will hereinafter appear.

The fingers having been impressed upon the paper placed on the platen as described, and the platen being in the position as shown in Figs. 1, 2, 3, 4, and 5, the platen then being upon the exterior of the casing as plainly shown in the figures referred to, the backwardly bent portions of the arms 5 and 6 extending through slots in the casing, (an opening 23 is also provided in the casing through which the platen may be moved in and out), the platen may then be moved forward, the gudgeon 21 passing through the channel 24 between the catch member 25 pivoted at 26 in the casing and the member 27 pivoted at 28 in the casing. The movement of the member 27 about its pivot has a pin 29 extending laterally from it and moving in the slot 30 in the casing.

It will be seen that the center of gravity of the piece 27 is well to the left (Fig. 5) of the pivotal point 28 and consequently this member tends to drop into the position as shown in Fig. 5. The member 25 has its center of gravity well to the left (Fig. 5) of its pivotal point 26 and consequently the left hand end of this member tends to drop. It is limited in its movement, however, by its end 31 coming against the end 32 of a dog 33 pivoted in the casing at 34, the movement of the end 32 being limited in its upward movement by the tail 35 of the dog coming against the end 36 of a slot in the guide piece 37 secured to the casing side. The end 32 and with it the end 31 of the member 35 may be depressed by moving the tail 35 of the dog 33 to the right (Fig. 5). This tail is normally pressed against the slot end 36 by means of a spring 38.

As the gudgeon 21 progresses along the passage 24 it will be lifted by the hump 39 on the member 27 so that the end 31 of the member 25 will be thrown into elevated position if there has been any sticking so that it has failed to come to this position under the influence of gravity.

Figure 6:
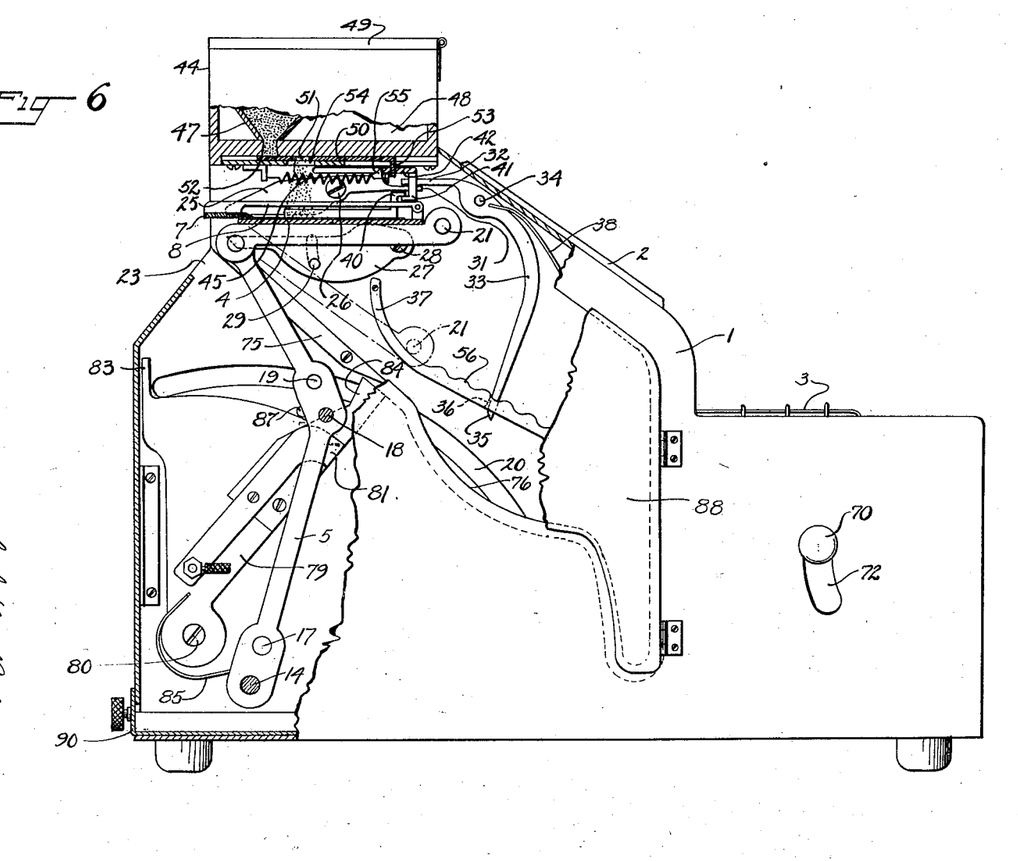
Fig. 6 is a side elevation looking in the direction of the arrow of Fig. 3 with one side partially broken away to show the interior, and partially in section, the paper carrier being shown in the position of receiving the pigment or fixing powder.

Further a hook 40 at the edge of the platen engages with a hook 41 on a lever 42 pivoted at 43 on the bottom of the hopper cabinet 44 for the pigment or fixing powder. This lever tends to be drawn to the left (Figs. 5 and 6) by a spring 45, this normal position of the lever is as shown in Fig. 5. The hook 40 on the platen having engaged with the hook 41, the lever 42 will be moved along with the platen into the position as shown in Fig. 6, the gudgeon 21 meanwhile having cleared the end of the member 27 but the forward end of the platen being prevented from dropping by the engagement of the hooks 40 and 41. The parts will then be in the position as shown in Fig. 6. Having arrived at this position, which represents the limit of movement of the lever 42, the platen will be prevented from further movement in a forward direction by reason of the engagement of the hooks 40 and 41. In order to move the platen further forward, it becomes necessary to reverse the push on the handle 19 so as to take off the hook 40 from the hook 41 when the forward end of the platen will fall, the gudgeon 21 striking a hammer blow against the guide piece 37 on the side of the casing. This hammer blow serves to effectively dislodge all fixing powder or pigment which does not adhere to the lines of the finger impression. This powder has been fed to the paper upon the platen while it is in the substantially horizontal position as shown in Fig. 6 and in the following manner.

Figure 10:
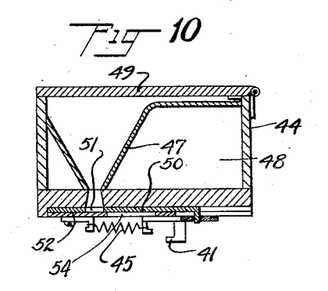
Fig. 10 is a section on the line 10—10 of Fig. 8.
Figure 11:
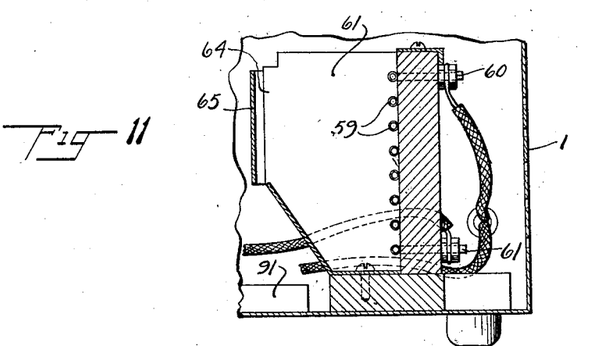
Fig. 11 is a sectional fragmentary view through the heater and shield.

The supply of powder in a dry state is placed in the V-shaped hopper 47 in the box 48 having the hinged lid 49 giving access to the hopper. The hopper is of greater length than width and is of a form in cross section as shown perhaps most clearly in Fig. 10. In order to convey the desired amount of powder to the impressed surface there slides upon the bottom of the cabinet 44 a plate 50 having a slot 51 of such dimensions that its cubic contents equal the amount of powder desired to be precipitated upon the impressed sheet at one operation. This slot is adapted to be moved into and out of registry with the mouth of the hopper, and when in such registry has its bottom closed by the plate 52 fixed to the bottom of the cabinet so that the slot in this position will be filled with powder from the hopper. This position of the slot 51 exists when the platen is in its initial position as shown for instance in Fig. 5. As the platen moves forward and engages and moves the lever 42 into the position as shown in Fig. 6, the plate 50 which is in engagement with the lever 42 by means of a downwardly extending tongue 53 projecting into a slot in the lever 42, is moved to the right (Fig. 6) carrying a slot-full of the powder until the slot 51 comes over a slot 54 in the plate 52 when the powder in the slot 51 will be discharged upon the impressed surface while it is in a substantially horizontal position as shown in Fig. 6. It will be apparent that at each discharge a slot-full of powder will be discharged upon the impressed surface and that the amount of powder so discharged may be regulated by regulating the cubic contents of the slot 51.

As the lever 42 is moved from the position as shown in Fig. 5 to the position as shown in Fig. 6, it will ride over the latch 55 upon the member 25, depressing the latch against the weight of the member on the other side of the pivot 26, and after the lever has passed by the latch the latter will rise back of it and prevent its return under the influence of the spring 45, the position of the parts being as shown in Fig. 6.

Returning now to the course of the forward movement of the platen which had been observed up to the point where the forward end of the platen had dropped and the gudgeon 21 comes against the guide 37, the platen may be moved forward by pressing the handle 19 forwardly and, passing over the undulations 56 of that member is thoroughly agitated with the platen in a steeply tilted position so that it is unlikely that any loose particles of powder not adhering to the impression lines will remain upon the impressed sheet. Also the gudgeon 21 will come against the tail 35 of the dog 33 thereby depressing its end 32 which in turn depresses the latch 55 and permits the lever 42 to return to the position as shown in Fig. 5, so that the slot 51 may receive another charge of powder and be in which might otherwise persist. This opening movement of the switch arm is limited by the shoulder 86 coming against the stop pin 87 mounted in the side of the casing.

It is believed that the operation of the apparatus will be fully understood in connection with the description of the structure above given so that no further elaboration on this score is necessary.

A hinged door 88 secured by the pivoted button 89 affords means of access to the casing and it may be observed that the powder feeding lever 42 has a finger piece 90 extending to one side by which it may be reciprocated and the powder feed effected at will without operating the platen etc. as before described.

A drawer 91 is provided for catching superfluous powder which may be removed by withdrawing the drawer and reused.

While the invention has been illustrated in what is considered its best application it may have other embodiments without departing from its spirit and is not, therefore, limited to the structures shown in the drawings.

What I claim is:

1. In a finger print recording machine, the combination with a support for a sheet upon which an impression is to be recorded, of means for feeding powder to the impressed sheet, and means for fixing the impression, said support being movable to positions where the impression is accomplished, where the powder is fed and where the impression is fixed, and means for causing a pause in the movement of the support in the powder feeding position.

2. In a finger print recording machine, the combination with a support for a sheet upon which an impression is to be recorded, of means for feeding powder to the impressed sheet, and means for fixing the impression, said support being movable to positions where the impression is accomplished, where the powder is fed and where the impression is fixed, and means for enforcing a reverse movement of the sheet at a certain point in the travel of the support.

3. In a finger print recording machine the combination with a support for a sheet upon which an impression is to be recorded, of means for feeding powder to the impressed sheet and means for administering a hammer blow to the sheet support.

4. In a finger print recording machine, the combination with a support for a sheet upon which an impression is to be recorded, of means for feeding powder to the impressed sheet and means for administering a hammer blow to the sheet support while the sheet is in an inclined position.

5. In a finger print recording machine, the combination with a support for a sheet upon which an impression is to be recorded, of means for feeding powder to said sheet, and means for fixing the impression, said support being movable into positions where the impression is accomplished, where the powder is fed and where the impression is fixed, said support comprising moving supporting arms and a tilting paper holder thereon.

6. In a finger print recording machine, the combination with a pivotally mounted support for a sheet upon which an impression is to be recorded, of means for feeding powder to said sheet, and means for fixing the impression, said support being movable into positions where the impression is accomplished, where the powder is fed and where the impression is fixed, said support comprising moving supporting arms and a tilting paper holder thereon.

7. In a finger print recording machine, the combination with a support for a sheet upon which an impression is to be recorded, of means for feeding powder to said sheet, and means for fixing the impression, said support being movable into positions where the impression is accomplished, where the powder is fed and where the impression is fixed, said support comprising moving supporting arms and a tilting paper holder thereon, and guides for regulating the tilting of the paper holder.

8. In a finger print recording machine, the combination with a pivotally mounted support for a sheet upon which an impression is to be recorded, of means for feeding powder to said sheet, and means for fixing the impression, said support being movable into positions where the impression is accomplished, where the powder is fed and where the impression is fixed, said support comprising moving supporting arms and a tilting paper holder thereon, and guides for regulating the tilting of the paper holder.

9. In a finger print recording machine, the combination with a support for a sheet upon which an impression is to be recorded, said support comprising a pivoted platen or paper holder, of means for feeding powder to the said sheet, means for fixing the impression, said support being movable to bring the platen successively to the positions where the impression is accomplished, where the powder is fed and where the impression is fixed, and guides for defining the movement of the platen about its pivot with relation to the remainder of said support.

10. In a finger print recording machine, the combination with a pivoted support for a sheet upon which an impression is to be recorded, said support comprising a platen or paper holder pivotally connected with the remainder of the support, said support being movable about its pivot to bring the sheet into positions where the impression is accomplished, where the powder is fed and readiness to discharge its contents upon the impressed surface upon the next forward movement of the platen from its impressing position.

Figure 7:
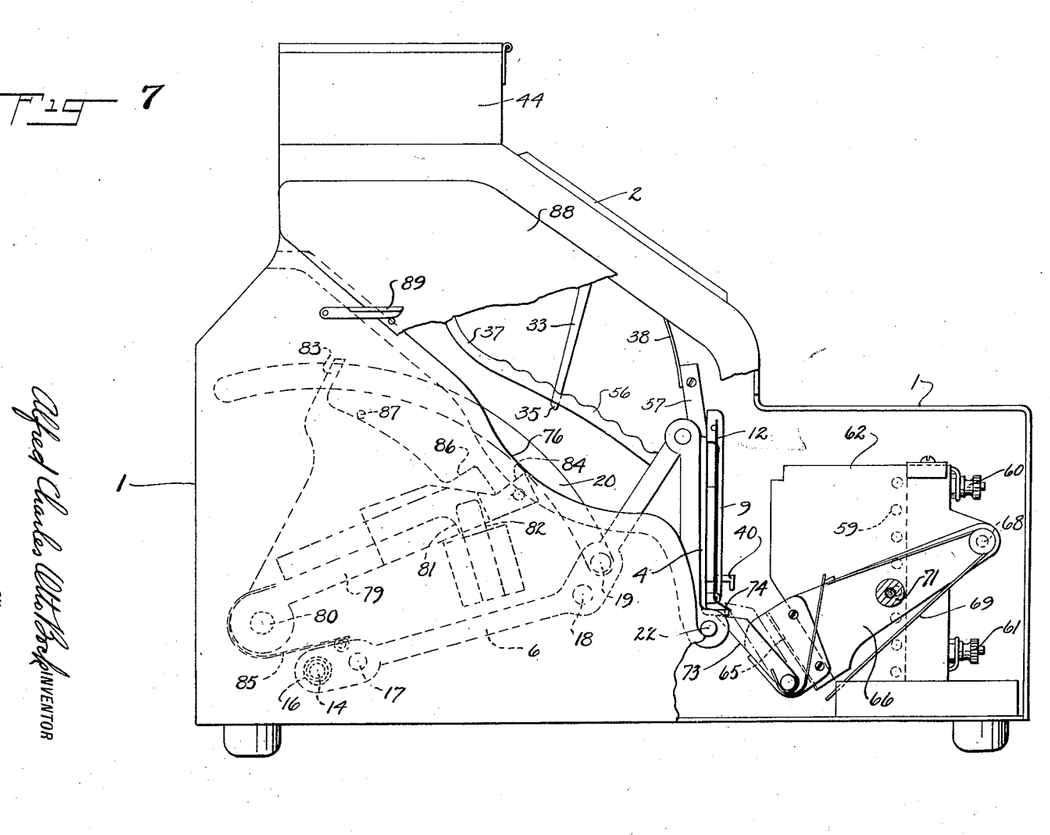
Fig. 7 is a side elevation similar to Fig. 6 but showing the paper carrier in the position of fixing the pigment or powder to the paper.
Figure 8:
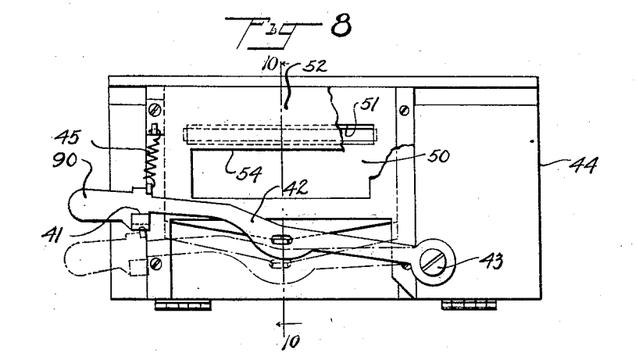
Fig. 8 is a bottom plan view of the hopper for the fixing powder.
Figure 9:
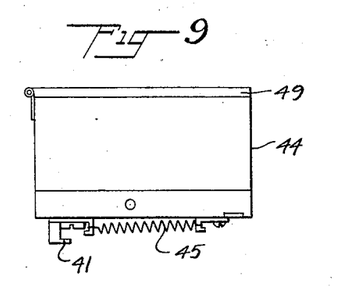
Fig. 9 is an end view of the same.

Passing on beyond the member 37 the gudgeon 21 will be guided by the piece 57 into the slot 58 in that piece so that the impressed surface of the platen will lie in a substantially vertical position as shown in Fig. 7, the impressed side of the impressed sheet of paper facing the electric heating coils 59. These heating coils are of bare wire of such characteristics as to become heated to the necessary extent by the passage of electric current through them, these coils being suitably mounted and insulated and connected with the terminals 60 and 61 in a manner well understood. About the heating coils 59 is a housing having the sides 62 and 63 but with an opening 64 at the front through which heat may be radiated from the coils 59 to the impressed surface on the platen. This opening, however, is adapted to be closed by a shield or side 65 of sheet metal which will then intercept the radiation of heat from the coils to the platen and prevent inadvertent injury to the impressed paper because the shield will be normally in position to intercept the heat and only upon action of the operator to remove the shield will the paper be subjected to the heat and then the operator can allow this action to continue as long as he deems expedient.

The plate 65 is mounted upon the arms 66 and 67 pivoted upon the bar 68 so that it may be readily moved into and out of shielding position, a spring 69 normally holding the shield in shielding position. The shield may be moved out of shielding position by pushing downwardly upon the handle 70 which is outside the casing, a shank 71 of the handle passing through the slot 72 in the casing and being secured to the arm 66. When the platen and the impressed surface arrive at the position as shown in Fig. 7, the shield 65 will be in position to intercept the heat tending to be radiated to it. The operator on depressing the handle 70, however, will remove this shield and, having depressed the shield to its lowermost position, the spring dog 73 will snap under a lug 74 on the platen so that the heat will be applied to fix the powder or pigment upon the impression for such length of time as may be desirable. At the end of that time the platen will be pushed to the rear by the handle 19, into the ultimate position as shown in Fig. 5 when the paper bearing the fixed imprint may be removed and a blank sheet inserted in its place for a repetition of the operation.

Figure 1:
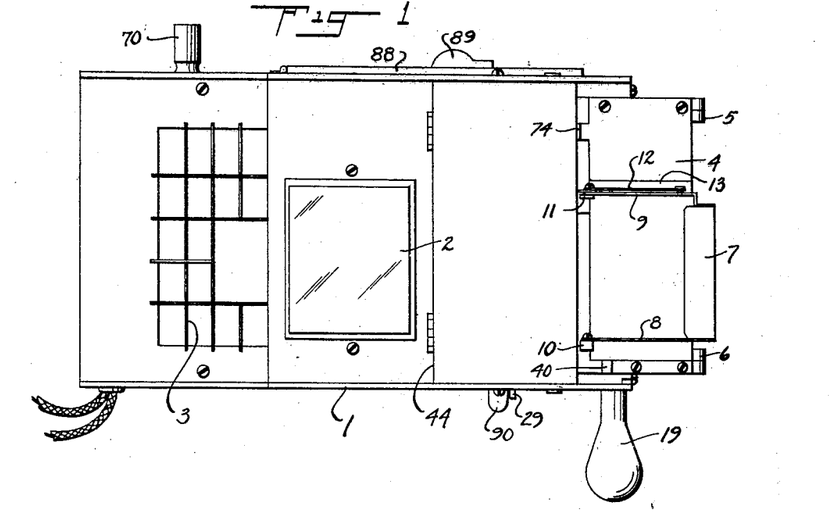
Fig. 1 is a top plan view of a machine embodying the invention.
Figure 2:
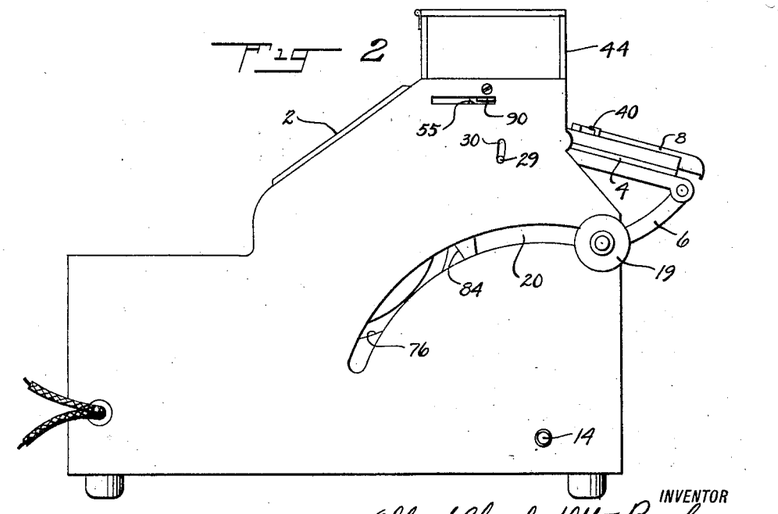
Fig. 2 is a side elevation of the machine shown in Fig. 1.
Figure 3:
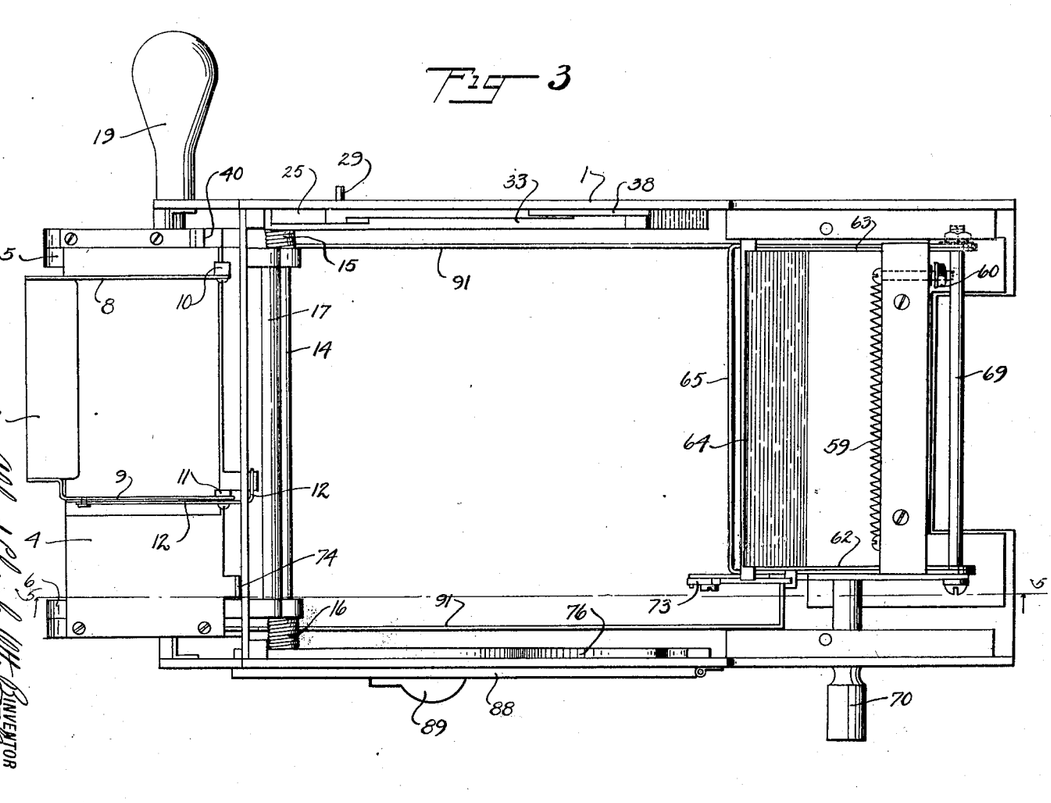
Fig. 3 is a top plan view with the top of the casing removed, of the apparatus of Figs. 1 and 2, but on a larger scale.
Figure 4:
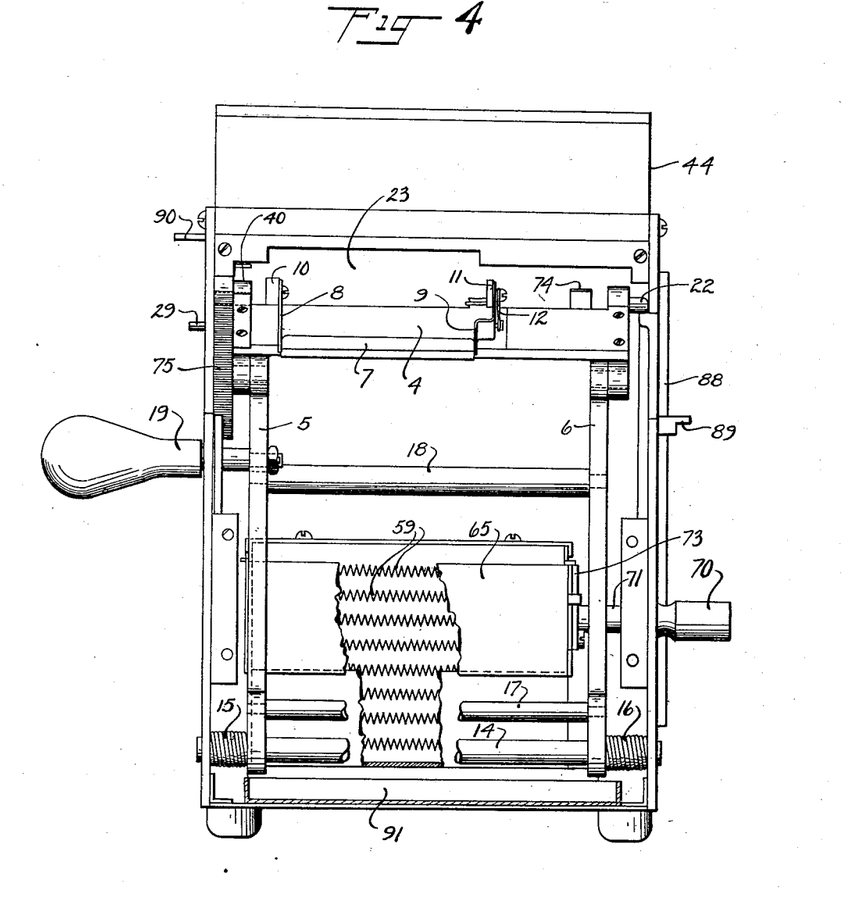
Fig. 4 is an end elevation from the left-hand end of Fig. 3 with the end of the casing removed.

In returning to its finger impressing position as shown in Fig. 1 from the fixing position as shown in Fig. 7, the platen will be guided by the guide piece 57 as it leaves the slot 58 and then from the piece 57 to the guide piece 75 the platen is guided by the gudgeon 22 on the opposite side of the platen coming against the guide piece 76 on the other side of the casing from that to which the guide pieces 57 and 75 are secured. Passing along the guide piece 75 the gudgeon 21 will lift the tail 77 of the member 27 and pass beyond it into the notch 78 in the end of the guide piece 75 which limits the backward movement of the platen. The tail 77 having been passed by the gudgeon as described, the former will drop into the position as shown in Fig. 5 in readiness for a repetition of the impressing and fixing operations.

As the platen is raised from the position as shown in Fig. 7 the shield 65 will rise under spring pressure as before referred to into the position as shown in Fig. 5, the projection 74, in this movement of the platen, being moved out of the path of the dog 73.

It is desirable that the heating coils 59 should be connected in circuit at approximately those times when they are in use and to have the circuit broken to cut off the current at other times. To this end a switch is provided in the supply connections to the heater coils which is operated by the movement of the platen as before described to open and close the circuit of these coils. This switch comprises an arm 79 pivoted to the casing at 80 and which carries a suitably insulated contact 81 adapted to be moved into and out of engagement with a suitably insulated contact 82 mounted upon the casing. As will be seen the arm 79 is sector-shaped having projections 83 and 84 at its outermost corners and its tendency is to move into the position as indicated in Fig. 5, when the contact 81 is released from the contact 82, under the influence of the spring 85.

As the platen is moved forward, as before described, the shank of the handle 19 comes against the projection 84 and moves the arm 79 forward so that the contact 81 is brought into engagement with the contact 82, the shank of the handle 19 then passing on by the projection 84 which is moved out of the shank pathway. The switch will then be in the position as shown in Fig. 7 and will remain in this position owing to the frictional engagement of its engaging contacts.

On the return movement the shank of the handle does not engage the projection 84 which, as before observed was moved out of the pathway by the forward movement of the handle. On coming against the projection 83, however, the contact 81 is pulled loose from the contact 82 when the spring 85 causes what is known as a "quick break" the rapid separation of the contacts tending to destroy any arcs between the contacts where the impression is fixed, and guides for regulating the position of the platen with relation to its pivot.

11. In a finger print recording machine, the combination with a support for a sheet upon which an impression is to be recorded, said support comprising a platen or paper holder movable with relation to the remainder of the support, said support being movable to carry the sheet from the position of impression to the position of receiving the powder for fixing the impression and thence to the position of fixing the powder upon the impression, guides for regulating the position of the platen or paper holder with relation to the remainder of the support during the movement of said support to carry the sheet from the impression position to the fixing position, and different guides for regulating the position of the platen or paper holder with relation to the remainder of the support when the said support is moved in the reverse direction.

12. In a finger print recording machine, the combination with means for supporting the paper in position to receive an impression, means for applying powder thereto and means for applying heat to the paper upon the side upon which the powder is located.

13. In a finger print recording machine the combination with a support for the sheet which is to receive the impression and means for supplying powder to said impression comprising a reciprocating member controlling the feed of the powder to the said impression from said hopper and means for heating the powder upon the impression to fix the same.

14. In a finger print recording machine, the combination with a support for the sheet which is to receive the impression, means for feeding powder to said impression, means for heating said powder to fix it on the sheet and a movable shield for intercepting the heat between said means and the impressed sheet.

15. In a finger print recording machine, the combination with a movable support for the sheet which is to receive the impression, means for feeding powder to said impression, means for heating said powder to fix it on the sheet and a movable shield for intercepting the heat between said means and the impressed sheet, said shield being controlled by said support.

16. In a finger print recording machine, the combination with a pivoted support comprising as a portion thereof a pivoted paper holder or platen, means for feeding powder to the impressed paper comprising a hopper and reciprocating powder discharging means controlled by the movement of said support, a heater for heating the powdered impression to fix the same, said support being movable about its pivot to bring said sheet from the position of impression to the position of powder feed and to the position of fixing, guides for regulating the position of the platen or paper holder about its pivot, said guides holding said platen in different positions when moving away from the fixing position than when moving toward the fixing position, means for enforcing a pause in the movement of the sheet in the powder feeding position and a movable shield for intercepting the heat from said heater to the impressed sheet, said shield being controlled by the movement of said support.

In testimony whereof I have signed this specification this 27th day of May, 1921.

ALFRED CHARLES OTTO BOCK.